US 11,451,175 B2

(12) United States Patent
Zhang et al.

(10) Patent No.: US 11,451,175 B2
(45) Date of Patent: Sep. 20, 2022

(54) EARLY FAULT DETECTION AND MITIGATION FOR ELECTRIC MOTORS

(71) Applicant: GM GLOBAL TECHNOLOGY OPERATIONS LLC, Detroit, MI (US)

(72) Inventors: Jiyu Zhang, Sterling Heights, MI (US); Lei Hao, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 165 days.

(21) Appl. No.: 16/705,534

(22) Filed: Dec. 6, 2019

(65) Prior Publication Data

US 2021/0175826 A1 Jun. 10, 2021

(51) Int. Cl.
| | |
|---|---|
| *H02P 21/16* | (2016.01) |
| *H02P 21/22* | (2016.01) |
| *H02P 21/20* | (2016.01) |
| *H02P 29/024* | (2016.01) |

(52) U.S. Cl.
CPC .............. *H02P 21/16* (2016.02); *H02P 21/20* (2016.02); *H02P 21/22* (2016.02); *H02P 29/0241* (2016.02); *H02P 2205/03* (2013.01)

(58) Field of Classification Search
CPC .......... H02P 21/16; H02P 21/20; H02P 21/22; H02P 2205/03; H02P 29/0241
USPC ........................................ 318/400.02; 702/58
See application file for complete search history.

(56) References Cited

U.S. PATENT DOCUMENTS

| | | | |
|---|---|---|---|
| 8,754,603 B2 * | 6/2014 | Arnett | ...................... H02P 3/18 |
| | | | 318/432 |
| 10,026,241 B1 | 7/2018 | Sankavaram et al. | |
| 10,054,030 B2 | 8/2018 | Duan et al. | |
| 10,152,834 B1 | 12/2018 | Sankavaram et al. | |
| 10,161,370 B2 | 12/2018 | Sarwar et al. | |
| 10,167,803 B2 | 1/2019 | Sarwar et al. | |
| 10,273,867 B2 | 4/2019 | Duan et al. | |
| 10,355,634 B1 | 7/2019 | Zhang et al. | |
| 10,378,501 B2 | 8/2019 | Sarwar et al. | |
| 10,408,098 B2 | 9/2019 | Sarwar et al. | |
| 10,443,530 B1 | 10/2019 | Li et al. | |
| 2012/0173066 A1 * | 7/2012 | Yamada | .................. H02P 21/18 |
| | | | 701/22 |
| 2014/0236501 A1 * | 8/2014 | Mao | ..................... H02P 29/0241 |
| | | | 702/58 |
| 2018/0144600 A1 * | 5/2018 | Grubis | .................. A61B 5/746 |
| 2019/0040812 A1 | 2/2019 | Sarwar et al. | |
| 2019/0250205 A1 | 8/2019 | Sarwar et al. | |

OTHER PUBLICATIONS

U.S. Appl. No. 15/978,720, filed May 14, 2018, Sarwar et al.
U.S. Appl. No. 16/052,958, filed Aug. 2, 2018, Duan et al.

* cited by examiner

*Primary Examiner* — Muhammad S Islam
*Assistant Examiner* — Zemenay T Truneh

(57) ABSTRACT

A control system for an electric motor includes a power input calculating module configured to calculate power input to the electric motor. A power output calculating module is configured to calculate power output by the electric motor. A power loss calculating module is configured to calculate power loss in the electric motor based on the power input and the power output. A fault module is configured to compare the power loss in the electric motor to one or more predetermined power loss thresholds and to selectively alter operation of the electric motor based on the comparison.

10 Claims, 3 Drawing Sheets

EARLY FAULT DETECTION AND MITIGATION FOR ELECTRIC MOTORS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to fault detection and mitigation for electric motors of vehicles.

Vehicles such as electric vehicles and/or hybrid vehicles may include one or more electric motors that are used to propel the vehicle. It is difficult to diagnose electric motor faults. If the electric motor fails, loss of propulsion may occur and occupants of the vehicle may experience a walk home situation.

SUMMARY

A control system for an electric motor includes a power input calculating module configured to calculate power input to the electric motor. A power output calculating module is configured to calculate power output by the electric motor. A power loss calculating module is configured to calculate power loss in the electric motor based on the power input and the power output. A fault module is configured to compare the power loss in the electric motor to one or more predetermined power loss thresholds and to selectively alter operation of the electric motor based on the comparison.

In other features, a current sensor is configured to sense current supplied to the electric motor. A voltage sensor senses a voltage supplied to the electric motor. The power input calculating module calculates the power input to the electric motor based on the voltage and the current supplied to the electric motor. A rotor sensor is configured to sense a speed of a rotor of the electric motor. A torque calculating module is configured to calculate torque output by the electric motor. The power output calculating module is configured to calculate the power output by the electric motor based on the speed of the rotor and the torque output by the electric motor.

In other features, a plurality of current sensors sense a plurality of stator winding currents, respectively. A current converting module is configured to calculate a quadrature axis current and a direct axis current based on the plurality of stator winding currents.

In other features, the torque calculating module is configured to calculate the torque output by the electric motor based on the quadrature axis current and the direct axis current. When the power loss is less than a first predetermined power loss threshold of the one or more predetermined power loss thresholds, the fault module declares that the electric motor is healthy. When the power loss is greater than the first predetermined power loss threshold and less than a second predetermined power loss threshold of the one or more predetermined power loss thresholds, the fault module generates a first warning.

In other features, when the power loss is greater than the first predetermined power loss threshold and less than a second predetermined power loss threshold, the fault module schedules maintenance. When the power loss is greater than the second predetermined power loss threshold, the fault module generates a second warning and reduces torque output of the electric motor.

A method for controlling an electric motor includes calculating power input to the electric motor; calculating power output by the electric motor; calculating power loss in the electric motor based on the power input and the power output; and altering operation of the electric motor in response to the power loss in the electric motor being greater than one or more predetermined power loss thresholds.

In other features, the method includes sensing current and voltage supplied to the electric motor; and calculating the power input to the electric motor based on the voltage and the current supplied to the electric motor.

In other features, the method includes sensing a speed of a rotor of the electric motor; calculating torque output by the electric motor; calculating the power output by the electric motor based on the speed of the rotor and the torque output by the electric motor; and calculating a quadrature axis current and a direct axis current based on a plurality of stator winding currents.

In other features, the method includes calculating the torque output by the electric motor based on the quadrature axis current and the direct axis current. The method includes declaring that the electric motor is healthy when the power loss is less than a first predetermined power loss threshold of the one or more predetermined power loss thresholds.

In other features, the method includes generating a first warning when the power loss is greater than the first predetermined power loss threshold and less than a second predetermined power loss threshold of the one or more predetermined power loss thresholds. The method includes scheduling maintenance when the power loss is greater than the first predetermined power loss threshold and less than a second predetermined power loss threshold of the one or more predetermined power loss thresholds.

In other features, the method includes generating a second warning and reducing torque output of the electric motor when the power loss is greater than the second predetermined power loss threshold.

A control system for an electric motor includes a power input calculating module configured to calculate power input to the electric motor based on a bus voltage and current supplied to the electric motor. A power output calculating module is configured to calculate power output by the electric motor based on a speed and a torque output of the electric motor. A power loss calculating module is configured to calculate power loss in the electric motor based on the power input and the power output. A fault module is configured to compare the power loss in the electric motor to one or more predetermined power loss thresholds and to selectively alter operation of the electric motor based on the comparison. When the power loss is less than a first predetermined power loss threshold of the one or more predetermined power loss thresholds, the fault module declares that the electric motor is healthy. When the power loss is greater than the first predetermined power loss threshold and less than a second predetermined power loss threshold of the one or more predetermined power loss thresholds, the fault module at least one of generates a first warning and schedules maintenance. When the power loss is greater than the second predetermined power loss threshold, the fault module generates a second warning and reduces torque output of the electric motor.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
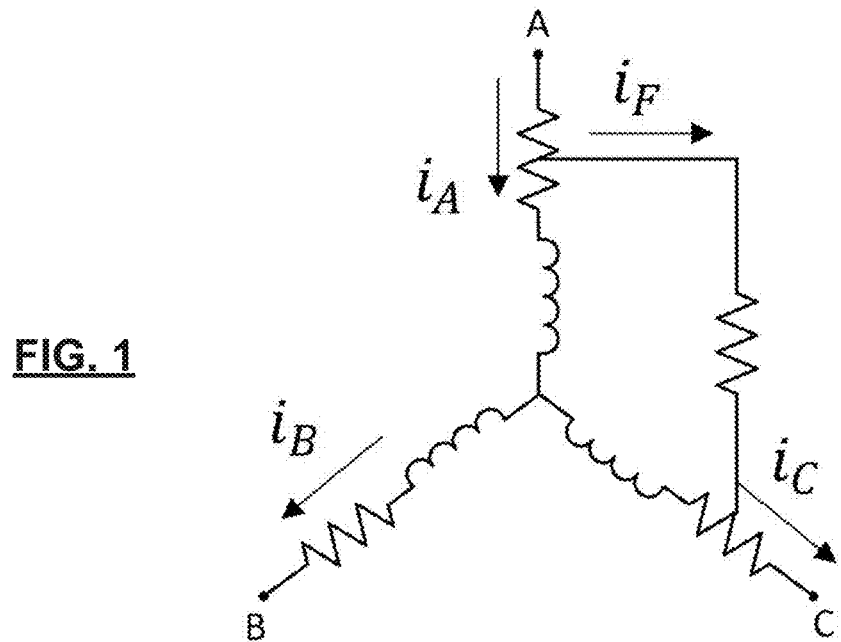
FIG. 1 is an electrical schematic of an example model of stator windings of an electric motor with a winding fault.

The present disclosure relates to fault detection and mitigation strategies for control systems for electric motors. Early detection of electric motor faults may be performed prior to significant performance degradation and/or damage to other driveline components. By performing detection earlier, loss of propulsion and/or walk home situations can also be reduced and/or avoided.

While the foregoing disclosure will be described in the context of permanent magnet synchronous machines (PMSMs), the systems and methods can be applied to other types of machines such as induction motors and brushless DC motors, which are also commonly used in automotive applications. Unlike PMSM and brushless DC motors which have a permanent magnet rotor to generate rotor magnetic field, induction motors have a conductive rotor where rotor currents and fluxes are induced in the rotor bars to generate magnetic field.

The fault detection and mitigation systems and methods described herein monitor power loss of the electric motor. Power loss refers to the difference between input power and output power. The input power to the electric motor is calculated based on the DC bus voltage and current. The output power is calculated based on electric motor torque and rotor speed.

Changes in power loss over time can be used to detect slow degradation of the electric motor. After the stator windings degrade to a certain level (or a predetermined power loss), systems and methods according to the present disclosure implement a torque limiting strategy to mitigate the effects of the fault and/or to reduce further damage to the electric motor and/or other components of the vehicle.

The systems and methods set forth herein detect electric motor faults including both stator winding faults and rotor faults. For PMSM or brushless DC motors, the rotor fault usually relates to a demagnetization fault. For induction motors, the rotor fault can be broken rotor bars and/or shorted rings. These failure modes all contribute to reduction of torque.

Systems and methods according to the present disclosure detect motor faults relatively early. As a result, the power loss will only be significant in a low power region (when speed and torque are relatively low).

Systems and methods according to the present disclosure detect degradation in an electric motor caused by stator winding faults and/or rotor faults. Systems and methods according to the present disclosure compute the difference between input power to the electric motor and the output power of the electric motor. The difference represents the power loss in the electric motor.

Systems and methods according to the present disclosure compare the power loss to one or more predetermined power loss thresholds. When the power loss exceeds a first power loss threshold, the control system generates an audible or visual warning for the electric motor fault and/or schedules maintenance. When the power loss exceeds a second power loss, additional action can be taken such as audible or visual warnings and/or limiting the torque output by the electric motor.

Referring now to FIG. 1, stator windings (each represented as a resistance in series with an inductor) of an electric motor are shown. When the electric motor is healthy, stator winding current $i_A$ is approximately equal to a sum of stator winding currents $i_B$ and $i_C$. When there is a stator fault in the electric motor (such as degradation/breakdown in the stator winding insulation), a magnitude of fault current ($i_F$) in the stator winding isolation increases from zero (no stator fault), which increases power loss. When there is no stator fault, $i_F=0$. Other faults may also cause power loss. When a rotor demagnetization fault occurs in the electric motor (and the flux linkage $\lambda_m$ decreases), torque produced by the electric machine decreases, which will also lead to increased power loss.

Figure 2:
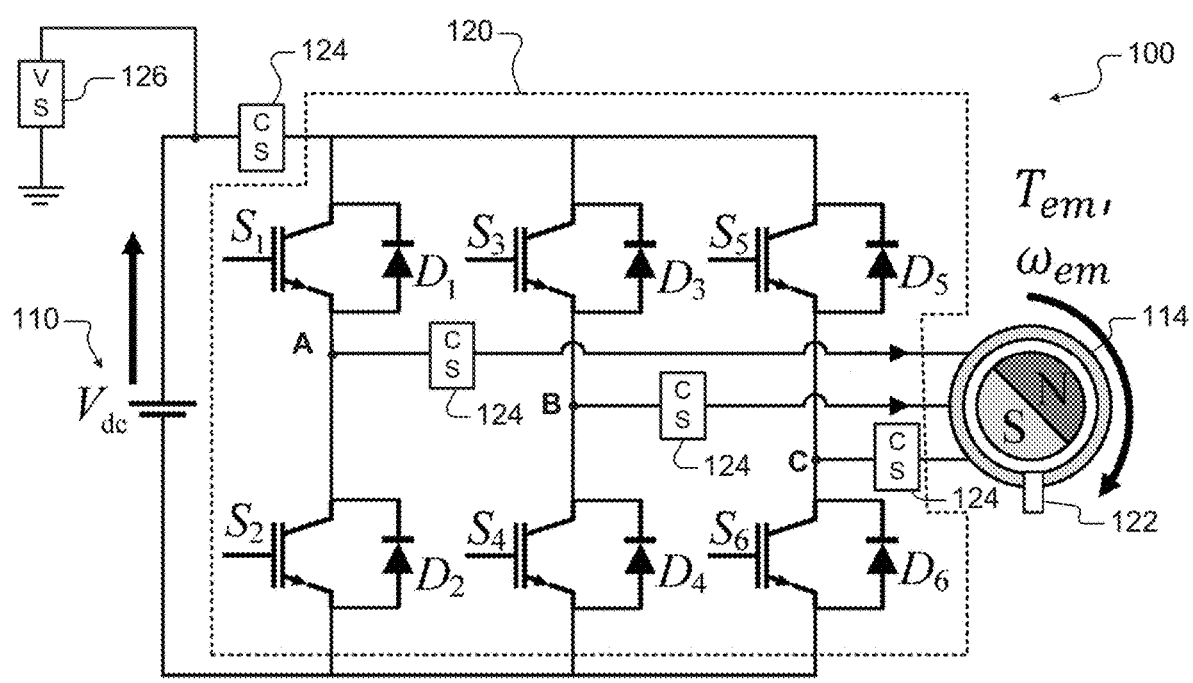
FIG. 2 is an electrical schematic and functional block diagram of an example of a portion of control system with fault detection and mitigation for an electric motor according to the present disclosure.

Referring now to FIG. 2, an electric motor system 100 includes a voltage source 110 and an electric motor 114. An inverter 120 is arranged between the voltage source 110 and the electric motor 114. The inverter 120 includes pairs of switches (e.g. S1 and S2, S3 and S4, and S5 and S6) and pairs of diodes (D1 and D2, D3 and D4, and D5 and D6), respectively, connected across the pairs of switches. Stator windings of the electric motor 114 are connected to nodes located between the pairs of switches.

A current sensor 124 and a voltage sensor 126 sense DC bus voltage $V_{DC}$ and DC bus current $I_{DC}$ supplied to the electric motor 114. Additional current sensors 124 sense stator currents $i_A$, $i_B$ and $i_C$. In some examples, two of the three stator currents are sensed. In other examples, all of the stator currents are sensed. A position sensor 122 senses a position/speed of the rotor of the electric motor 114.

Figure 3:
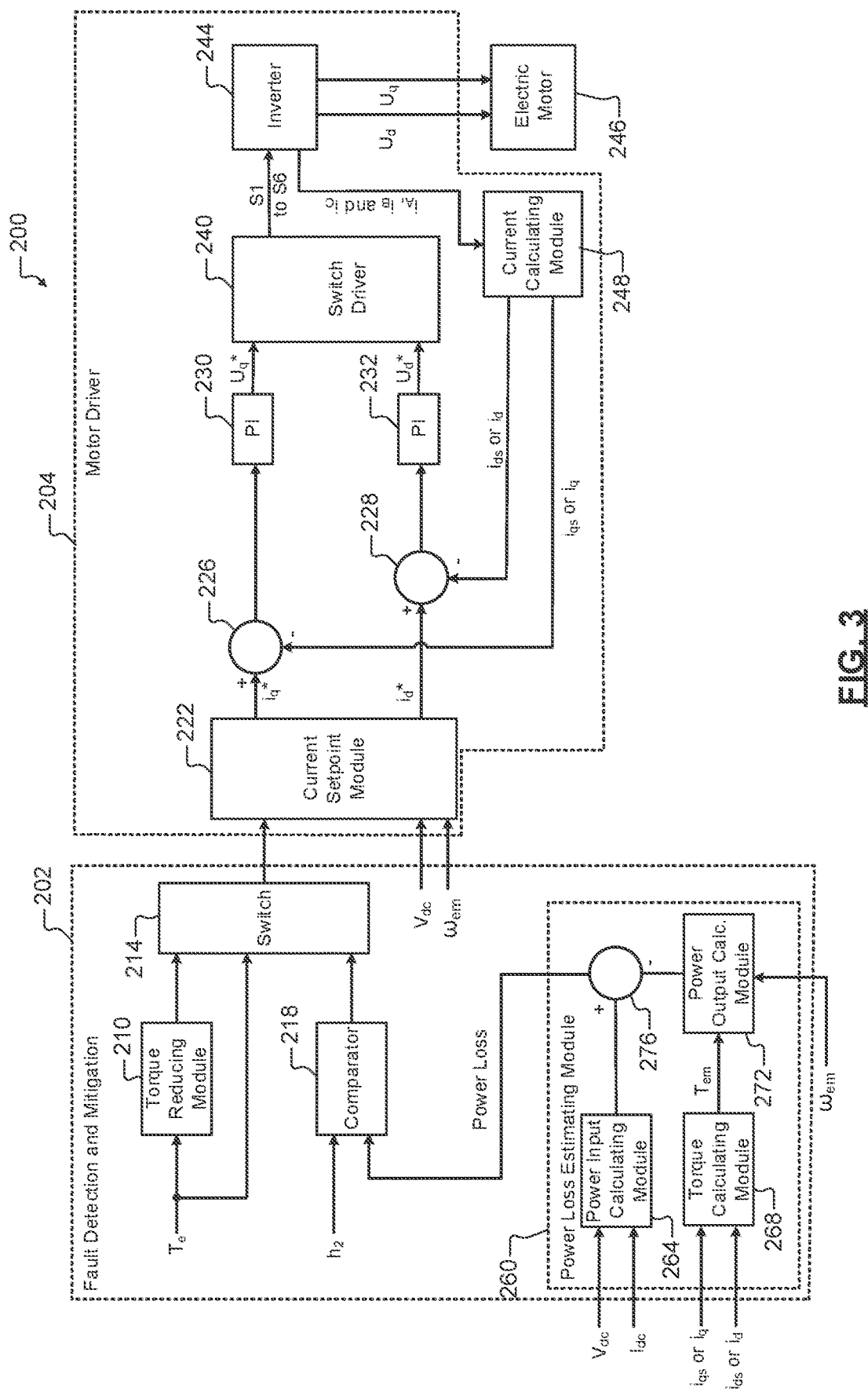
FIG. 3 is a more detailed functional block diagram of a control system with fault detection and mitigation for an electric motor according to the present disclosure.

Referring now to FIG. 3, the control system 200 includes a fault detection and mitigation module 202 and an electric motor driver 204. The electric motor driver 204 generates drive signals for the switches S1 to S6 based upon one or more inputs as will be described further below. The fault diagnosis and mitigation module 202 estimates electric motor power loss. The fault diagnosis and mitigation module 202 diagnoses faults in the electric motor based upon the estimated electric motor power loss and selectively adjusts one or more operating parameters of the electric motor as will be described further below.

The fault detection and mitigation module 202 includes a torque reducing module 210 receiving a motor torque request and outputting a reduced motor torque request ($T_{e\_reduced}^*$). In some examples, the torque reducing module 210 includes a lookup table indexed by the electric motor torque request $T_e^*$. In other examples, the torque reducing module 210 implements a linear or non-linear function that reduces the electric motor torque request when a fault is detected.

A switch 214 selects either the electric motor torque request $T_e^*$ or the reduced torque request $T_{e\_reduced}^*$ output by the torque reducing module 210 based on an output of a comparator 218. The comparator 218 receives an estimated electric motor power loss and a threshold $h_2$. When the estimated motor power loss is less than the threshold $h_2$, the output of the comparator 218 causes the switch 214 to select the electric motor torque request $T_e^*$. When the estimated motor power loss is greater than or equal to the threshold $h_2$, the output of the comparator 218 causes the switch 214 to select the reduced motor torque request $T_{e\_reduced}^*$ from the torque reducing module 210.

The switch 214 outputs the electric motor torque request $T_e^*$ or the reduced motor torque request $T_{e\_reduced}^*$ to a current setpoint module 222. In some examples, the current setpoint module 222 includes a lookup table indexed by the voltage $V_{DC}$ and the electric motor speed $\omega_{em}$. The current setpoint module 222 outputs q and d axis motor current commands $i_q^*$ and $i_d^*$ to non-inverting inputs of summers 226 and 228, respectively. Inverting inputs of summers 226 and 228 receive measured quadrature and direct axis motor currents $i_q$ and $i_d$, respectively.

Outputs of the summers 226 and 228 are input to proportional integral (PI) modules 230 and 232, respectively, which output direct and quadrature voltage commands $u_d^*$ and $u_q^*$ to a switch driver 240. In some examples, the switch driver 240 generates pulse width modulation (PWM) signals that are output to the switches S1 to S6 of an inverter 244. In some examples, the switch driver 240 includes a space vector PWM (SVPWM) driver, although other switch drivers and/or modulation may be used. Outputs of the inverter 244 (direct and quadrature axis voltages $u_d$ and $u_q$) are input to the electric motor 246. A current calculating module 248 calculates $i_q$ and $i_d$ based on stator winding currents $i_A$, $i_B$ and $i_C$ and outputs $i_q$ and $i_d$ to the inverting inputs of the summers 226 and 228.

A power loss estimation module 260 includes a power input calculator 264, a torque calculator 268, a power output calculator 272 and a summer 276. The power input calculator 264 calculates the power input based on the voltage $V_{DC}$ and the current $I_{DC}$. In some examples, the power input $P_{em,in} = V_{DC} * I_{DC}$. The torque calculator 268 calculates the torque $T_{em}$ based on $i_q$ and $i_d$.

For permanent magnet synchronous machines (PMSM), $T_{em} = 1.5P(\lambda_m * i_q + (L_q - L_d) * i_q * i_d)$, where P is the number of pole pairs of the electric motor, $\lambda_m$ is a constant representing flux linkage of the electric motor, and $L_q$ and $L_d$ are quadrature and direct axis inductances.

More generally, $T_{em} = 1.5P(\lambda_d * i_q - \lambda_q * i_d)$. Where $\lambda_q$ and $\lambda_d$ are d and q axis stator magnetic fluxes in a rotor reference frame, and is function of stator currents and rotor currents (for induction motor) or rotor magnetic strength (PMSM or brushless DC motors).

The power output calculator 272 calculates the power output based on the torque $T_{em}$ and rotor speed $\omega_{em}$. In some examples, the power output $P_{em,out} = T_{em} * \omega_{em}$. The summer 276 outputs the power loss based on the difference between the calculated power input $P_{em,in}$ and the calculated power output $P_{em,out}$.

Figure 4:
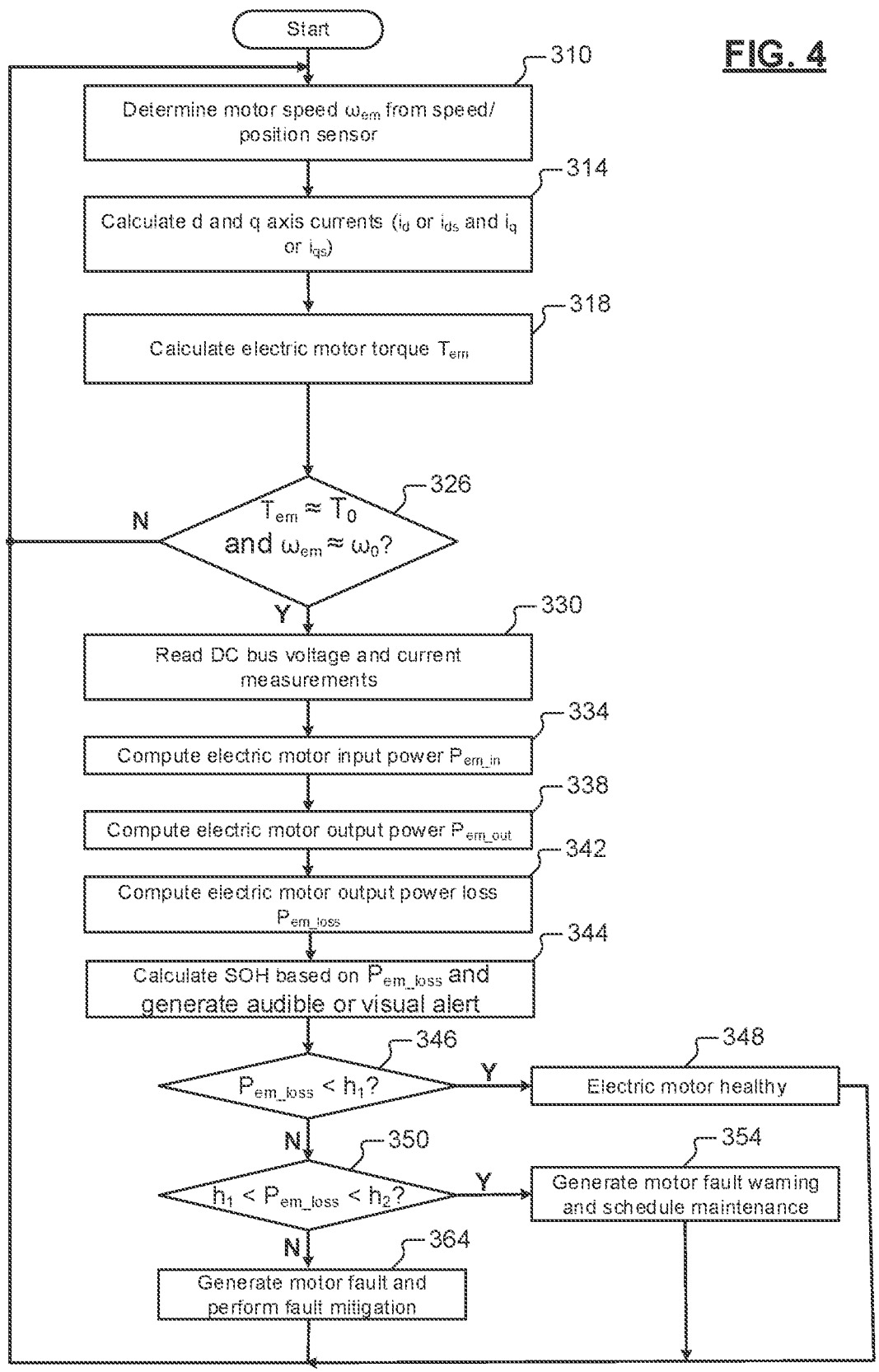
FIG. 4 is a flowchart of a method for diagnosing faults in an electric motor and performing mitigation in response to the faults.

Referring now to FIG. 4, a method for controlling an electric motor is shown. At 310, the method determines electric motor speed $\omega_{em}$ from the speed/position sensor. At 314, the d and q axis currents $i_q$ and $i_d$ are determined based on the stator winding currents $i_A$, $i_B$ and $i_C$. At 318, the electric motor torque $T_{em}$ is calculated. At 326, the electric motor torque $T_{em}$ and rotor speed $\omega_{em}$ are compared to a predetermined motor torque $T_0$ and a predetermined rotor speed $\omega_0$, respectively. If the electric motor torque $T_{em}$ is approximately equal to the predetermined motor torque $T_0$ and the rotor speed $\omega_{em}$ is approximately equal the rotor speed $\omega_0$, then the method continues at 330 and reads the DC bus voltage and currents $V_{DC}$ and $I_{DC}$.

At 334, the method computes the electric motor power input $P_{em\_in}$. At 338, the method computes the electric motor power output $P_{em\_out}$. At 342, the method computes the electric motor power loss $P_{em\_loss}$. At 344, the method computes a state of health (SOH) of the electric motor based on the power loss and optionally provides an audible or visual indicator. In some examples, the SOH is calculated as a linear or non-linear function of the power loss. Alternately, a lookup table indexed by motor power loss can be used.

At 346, if the electric motor power loss $P_{em\_loss}$ is less than a first predetermined power loss, the method continues at 348 and declares that the electric motor is healthy. If 346 is false, the method continues at 350.

At 350, if the electric motor power loss $P_{em\_loss}$ is greater than a first predetermined power loss $h_1$ and less than a second predetermined power loss $h_2$, the method continues at 354 and generates a motor fault and optionally schedules maintenance. If 350 is false, then the electric motor power loss $P_{em\_loss}$ is greater than the second predetermined power loss $h_2$. At 364, the method generates a motor fault and performs one or more fault mitigation actions. In some examples, the fault mitigation actions may include limiting total torque output of the electric motor above a predetermined torque output or reducing the torque output of the electric motor by a percentage or another function.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A method for controlling an electric motor, comprising:
    calculating power input to the electric motor based on a direct current (DC) bus voltage and a current supplied to the electric motor;
    calculating power output by the electric motor based on a torque of the electric motor and a rotor speed of the electric motor;
    calculating power loss in the electric motor based on the power input and the power output;
    comparing the power loss in the electric motor to one or more predetermined power loss thresholds;
    altering operation of the electric motor in response to the power loss in the electric motor being greater than one or more predetermined power loss thresholds;
    declaring that the electric motor is healthy when the power loss is less than a first predetermined power loss threshold of the one or more predetermined power loss thresholds;
    generating a first warning and scheduling maintenance when the power loss is greater than the first predetermined power loss threshold and less than a second predetermined power loss threshold of the one or more predetermined power loss thresholds; and
    generating a second warning and reducing torque output of the electric motor when the power loss is greater than the second predetermined power loss threshold.

2. The method of claim 1, further comprising:
    sensing the current and the DC bus voltage supplied to the electric motor.

3. The method of claim 1, further comprising:
sensing the rotor speed of a rotor of the electric motor; and
calculating the torque output by the electric motor.

4. The method of claim 3, further comprising calculating a quadrature axis current and a direct axis current based on a plurality of stator winding currents.

5. The method of claim 4, further comprising calculating the torque output by the electric motor based on the quadrature axis current and the direct axis current.

6. A control system for an electric motor, comprising:
a power input calculating module configured to calculate power input to the electric motor based on a bus voltage and current supplied to the electric motor;
a power output calculating module configured to calculate power output by the electric motor based on a speed and a torque output of the electric motor;
a power loss calculating module configured to calculate power loss in the electric motor based on the power input and the power output; and
a fault module configured to compare the power loss in the electric motor to one or more predetermined power loss thresholds and to selectively alter operation of the electric motor based on the comparison,
wherein when the power loss is less than a first predetermined power loss threshold of the one or more predetermined power loss thresholds, the fault module declares that the electric motor is healthy,
wherein when the power loss is greater than the first predetermined power loss threshold and less than a second predetermined power loss threshold of the one or more predetermined power loss thresholds, the fault module at least one of generates a first warning and schedules maintenance, and
wherein when the power loss is greater than the second predetermined power loss threshold, the fault module generates a second warning and reduces torque output of the electric motor.

7. The control system of claim 6, further comprising:
a current sensor configured to sense the current supplied to the electric motor; and
a voltage sensor configured to sense the bus voltage supplied to the electric motor.

8. The control system of claim 6, further comprising:
a rotor sensor configured to sense the rotor speed of a rotor of the electric motor, and
a torque calculating module configured to calculate the torque output by the electric motor.

9. The control system of claim 8, further comprising:
a plurality of current sensors to sense a plurality of stator winding currents, respectively; and
a current converting module configured to calculate a quadrature axis current and a direct axis current based on the plurality of stator winding currents.

10. The control system of claim 9, wherein the torque calculating module is configured to calculate the torque output by the electric motor based on the quadrature axis current and the direct axis current.

* * * * *